United States Patent [19]

Hart et al.

[11] Patent Number: 4,875,739

[45] Date of Patent: Oct. 24, 1989

[54] INDEPENDENT CONTINUAL QUICK SERVICE VALVE DEVICE

[75] Inventors: James E. Hart, Trafford; Edward W. Gaughan, Irwin, both of Pa.

[73] Assignee: American Standard Inc., Wilmerding, Pa.

[21] Appl. No.: 297,721

[22] Filed: Jan. 17, 1989

[51] Int. Cl.[4] .............................................. B60T 15/42
[52] U.S. Cl. ......................................... 303/33; 303/38; 303/82; 303/69
[58] Field of Search ............... 303/33, 37, 38, 39, 303/36, 40, 68–69, 43, 66, 72, 86, 73, 74, 82, 81, 83

[56] References Cited

U.S. PATENT DOCUMENTS

| | | | |
|---|---|---|---|
| 3,716,276 | 2/1973 | Wilson et al. | 303/82 |
| 3,988,044 | 10/1976 | Hill | 303/82 |
| 4,073,544 | 2/1978 | Hart | 303/83 |
| 4,103,977 | 8/1978 | Wickham | 303/38 |
| 4,145,090 | 3/1979 | Hart | 303/37 |
| 4,157,849 | 6/1979 | Wickham | 303/38 |
| 4,175,792 | 11/1979 | Hart | 303/37 |
| 4,206,949 | 6/1980 | Rathband et al. | 303/38 |
| 4,449,759 | 5/1984 | Eder | 303/38 |

Primary Examiner—Douglas C. Butler
Attorney, Agent, or Firm—G. J. Falce

[57] ABSTRACT

A continual type quick service valve adapted to be independently mounted on a railway car to provide local, supplemental venting of the car brake pipe pressure, as long as the brake pipe pressure continues to be reduced externally. This quick service venting of the brake pipe pressure is achieved utilizing a single piston actuated exhaust valve that is either cyclically-operated between open and closed states or is held open continuously depending upon the degree of brake application in effect. By selective tuning, the open duration of the exhaust valve can be made to exceed the duration the exhaust valve is closed during each cycle of operation or to remain open for the duration of the external brake pipe pressure reduction to achieve high operating efficiency.

13 Claims, 1 Drawing Sheet

INDEPENDENT CONTINUAL QUICK SERVICE VALVE DEVICE

BACKGROUND OF THE INVENTION

The present invention relates to quick service valves for use in automatic fluid pressure brake systems for railway trains, and particularly to such quick service valves as provide "continual" quick service operation in response to successive reductions in brake pipe pressure during a service brake application.

The well-known, standard ABDW control valve device used on freight-type railway cars to control the car brakes in response to variations in the train brake pipe pressure employs a quick service valve portion that provides the aforementioned "continual" quick service function. Unlike other "continual" quick service type valves, this ABDW quick service valve is piloted by the quick action chamber "breathing" pressure developed by the action of the ABDW valve emergency piston in providing stability against undesired emergencies during service brake applications. While the local venting of brake pipe pressure realized by the quick service activity of the ABDW control valve device is adequate under normal conditions, where unusually long runs of brake pipe occurs between these ABDW control valves, such as in intermodal, multi-pac, and other specialty-type car arrangements, a need exists for an additional quick service valve device that can be employed independently of the car control valve to supplement the local quick service action of the ABDW control valve in order to assure propagation of the brake pipe pressure reduction wave during service braking. Continual quick service valve devices known in the prior art are cyclic in operation, generally employing at least two separate valves to alternately vent brake pipe pressure locally in response to a reduction in the trainline brake pipe pressure and, subsequently, to vent a reference pressure with which the brake pipe pressure is compared across a control piston to terminate the local venting of brake pipe pressure for a time duration sufficient to assure that a subsequent cycle of operation can only result from a continuing reduction of the trainline brake pipe pressure and not from the local venting of brake pipe pressure.

Not only are these known prior art valve devices inefficient in operation, due to the absence of any quick service venting of brake pipe pressure during the "off" period of each cycle of operation, but perhaps more importantly, when used to supplement the ABDW quick service function, their cyclic operation tends to cause the ABDW quick service valves to stall out, since the "breathing" pressure that pilots the ABDW quick service valve operation tends to dissipate during the "off" period of each cycle. Accordingly, propagation of the pressure reduction wave through the train brake pipe can become degraded rather than improved by these known quick service valves when used to supplement an ABDW type quick service valve.

SUMMARY OF THE INVENTION

One object of the present invention is to provide a continual quick service valve device having an operating characteristic that provides high efficiency, so as to be compatible with ABDW type quick service valves.

Another object of the invention is to achieve high efficiency in a continual quick service valve device without losing stability.

Another object of the invention is to provide a continual quick service valve device that can be tuned to obtain optimum operating efficiency within a predetermined range of brake pipe pressure reductions.

Another object of the invention is to provide a continual quick service valve device that is capable of providing a level of performance on 100 ft. freight cars comparable to that provided by the ABDW control valve on 50 ft. cars.

Another object of the invention is to provide a continual quick service valve device that utilizes such a small control volume as to permit incorporating the control volume in the valve body in order to eliminate the need for a separate volume reservoir.

A final object of the invention is to provide a continual quick service valve device that is simple in construction and low in cost.

Briefly, according to the present invention, a novel continual type quick service valve device is provided in one embodiment in which first and second chokes are located in parallel flow paths via which the brake pipe pressure and a quick service reference chamber pressure are concurrently vented locally when a single, piston-operated exhaust valve is opened in response to a pressure differential across the exhaust valve control piston due to the trainline brake pipe pressure effective on one side of the control piston being reduced relative to the pressure of a quick service reference chamber acting on the opposite side. The sizes of the respective first and second chokes, and the volume of the quick service reference chamber are selected such that the time required to reduce this quick service chamber reference pressure sufficiently to reset the control piston and thus to effect closure of the exhaust valve establishes a cycling operation of the quick service valve, such that the duration the exhaust valve is open in each operating cycle is relatively long compared to the duration the exhaust valve is closed. It will be appreciated, therefore, that during the relatively long period that the exhaust valve is open, a local, quick service venting of brake pipe pressure takes place. As the open duration of the exhaust valve increases, so does the efficiency of the quick service valve, thus making the quick service valve, according to the present invention, highly compatible with the ABDW quick service valve.

Upon closure of the exhaust valve during each operating cycle, the local venting of brake pipe pressure, as well as venting of the quick service chamber reference pressure is terminated. Consequently, successive operating cycles are predicated on continued trainline reductions of brake pipe pressure.

In a second embodiment of the invention, a third choke is added downstream of the first and second chokes in order to create a back pressure against which the quick service reference chamber pressure is vented via the first choke. This has the effect of further restricting the blowdown rate of the quick service reference chamber pressure without increasing valve sensitivity.

In a third embodiment, a fourth choke is added via which the brake pipe pressure effective on the one side of the control piston is vented in bypass of the third choke, so that the local, quick service venting of brake pipe pressure is not impeded by the third choke.

BRIEF DESCRIPTION OF THE INVENTION

The foregoing objects and other advantages of the invention will become apparent from the following explanation when taken in conjunction with the drawings in which.

DESCRIPTION AND OPERATION

Figure 1:
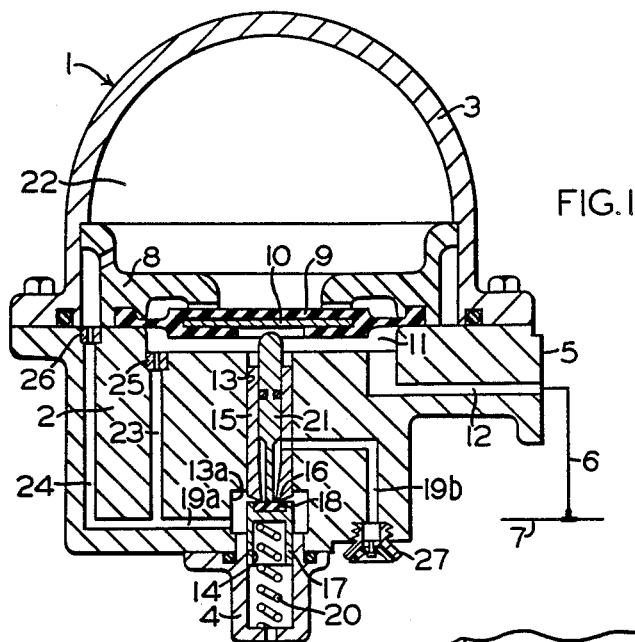
FIG. 1 is a diagrammatic assembly view, in section, showing a first embodiment of the invention having a two-choke arrangement for establishing the operating cycle that determines the local quick service venting of brake pipe pressure.

Referring now to the two-choke embodiment, as shown in FIG. 1, there is shown a quick service valve device 1 that includes a main body section 2, a top cover 3, and a bottom cover 4. Main body section 2 is provided with a mounting face 5 to which a branch pipe 6 of the train brake pipe 7 is connected in a well-known manner, quick service valve device 1 is thus adapted for mounting independently of other valve devices in a railway freight car automatic brake system, being particularly suited to intermodal cars and other specialty car arrangements having relatively long runs of brake pipe between successive control valve devices.

Clamped between the upper surface of main body section 2 and a retainer 8 of top cover 3 is a diaphragm-type control piston 9 having a reinforcing plate 10 molded therewith. A recess in the upper surface of main body section 2 forms, in cooperation with the underside of diaphragm 8, a control chamber 11 to which a passage 12 is connected from mounting face 5.

A bore 13 is provided in main body section 2 with one end opening into control chamber 11 and the opposite end terminating in a counterbore 13a. Formed in bottom cover 4 is a coaxial bore 14 having the same diameter as bore 13. A bushing 15 is pressed into bore 13 and is formed at its end adjacent counterbore 13a with an annular valve seat 16. A cylindrical valve carrier member 17 is disposed in bore 14 for axial movement therein and supports a valve element 18 that controls fluid flow communication via an exhaust passage having segments 19a, 19b. One end of exhaust passage segment 19a opens into counterbore 13a, while one end of exhaust passage segment 19b opens into bore 13. A bias spring 20 normally urges carrier member 17 in a direction to maintain valve element 18 in engagement with valve seat 16 to interrupt flow communication between exhaust passage segments 19a, 19b. Axially operable in bushing 15 is a valve stem 21, one end of which is engageable with valve element 18 and the other end of which is engageable with the reinforcing plate 10 of control piston 9.

Top cover 3 forms, in cooperation with the upper side of diaphragm piston 9, a quick service reference chamber 22, the periphery of which extends beyond the periphery of diaphragm control piston 9. Connected in parallel to the other end of exhaust passage segment 19a are passages 23 and 24 in main body section 2, passage 23 communicating with control chamber 11 and having a charging choke 25 therein, and passage 24 communicating with quick service reference chamber 22 beyond the periphery of diaphragm member 9 and having a choke 26 therein. Exhaust passage segment 19b is connected to atmosphere via a conventional vent protector 27.

During charging, compressed air is connected from brake pipe 7 and branch passage 6 to quick service reference chamber 22 via passage 12, control chamber 11, choke 25, passages 23 and 24, and choke 26. Chambers 11 and 22 are thus charged with compressed air to the pressure carried in the train brake pipe 7. With equal pressure thus acting on the opposite sides of control piston 9, spring 20 is effective to maintain valve element 18 in engagement with valve seat 16, thereby normally interrupting flow communication between exhaust passage segments 19a and 19b.

In response to an external reduction of the pressure carried in brake pipe 7, as by the well-known operator's control valve device (not shown), the pressure in control chamber 11 acting on the underside of control piston 9 is reduced via passage 12 at a rate corresponding to the rate of brake pipe reduction, while the pressure in chamber 22 acting on the upper side of control piston 9 is likewise reduced along with the brake pipe pressure via choke 26, passages 24 and 23, choke 25, control chamber 11, and passage 12, but at a reduced rate due to the effect of chokes 25 and 26. Consequently, a downward actuating pressure differential is created across diaphragm piston 9, causing valve stem 21 to disengage valve element 18 from valve seat 16 and thereby establish fluid flow communication between exhaust passage segments 19a, 19b. Upon unseating valve element 18, a local venting of brake pipe pressure effective in control chamber 11 is established via choke 25, passage 23, exhaust passage 19a, open exhaust valve 18, and exhaust passage 19b, while concurrently the quick service reference pressure effective in chamber 22 is vented locally via choke 26, passage 24, exhaust passage 19a, open exhaust valve 18, and exhaust passage 19b. This local quick service venting of brake pipe pressure supplements the external trainline reduction of brake pipe pressure to aid in providing fast and positive propagation of the brake pipe pressure wave through the train.

When the relative blowdown of pressures in chambers 11 and 22 is such that the downward actuating pressure differential across control piston 9 can no longer overcome the force of bias spring 20, valve element 18 is forced by spring 20 back into engagement with seat 16 to interrupt flow communication between exhaust passage segments 19a, 19b and thereby terminate the local venting of brake pipe pressure, thus completing one cycle of quick service activity provided by independent quick service valve device 1. In the event the external brake pipe reduction continues in effect, repeated cycles of operation of valve device 1 will result in the same manner as explained.

The intensity of the resultant quick service activity corresponds to the duration valve 18 remains open during each operating cycle, and this in turn is determined by the initial pressure differential created across control piston 9 and by the relative rates at which the differential pressures in chambers 11 and 22 blow down. Choke 26 is smaller in size than choke 25 and, in conjunction with the volume of chamber 22, determines the rate of blowdown of the quick service reference chamber pressure. Similarly, choke 25, in conjunction with the much larger volume of brake pipe pressure, determines the rate of blowdown of pressure effective in control chamber 11. Ideally, these relative blowdown rates would be such that the pressure differential across control piston 9 would only reduce sufficiently to allow spring 20 to close valve 18 in response to the external trainline brake pipe reduction being terminated. However, this would require choke 26 to be so small as to adversely affect valve sensitivity, particularly where the volume of reference chamber 22 is relatively small, which is necessary to eliminate the need for an external volume reservoir. In actual practice, choke 26 is selected so that valve operation is insensitive to brake pipe pressure reductions below that of a minimum service reduction. This minimum size limitation imposed on choke 26 results in a rate of blowdown of pressure in quick service reference chamber 22, that causes the pressure differential across control piston 9 to be reduced sufficiently that spring 20 is able to close valve 18. Since this can occur without the reduction of trainline brake pipe pressure being terminated, in reality, the quick service valve device 1 exhibits a cycling characteristic, but can be tuned to allow valve 18 to remain open for a longer duration than the valve is closed. The optimum performance of this embodiment of the invention was achieved using a #78 drill size for choke 26, and a #57 drill size for choke 25, combined with a 40–45 cubic inch volume of quick service reference chamber 22. In this sense, greater efficiency is obtained in terms of the amount of brake pipe pressure vented locally, while the desired level of valve sensitivity is maintained. Moreover, the greater the reduction of trainline brake pipe pressure, the greater the quick service intensity. For example, a full service reduction of brake pipe pressure will create a greater pressure differential across control piston 9 than a minimum service reduction will create. Accordingly, a longer blowdown time will be required before this greater pressure differential across diaphragm control piston 9 is overcome sufficiently to allow spring 20 to re-seat valve 18, during which time local quick service venting of brake pipe pressure occurs past the open valve 18, as previously discussed.

Figure 2:
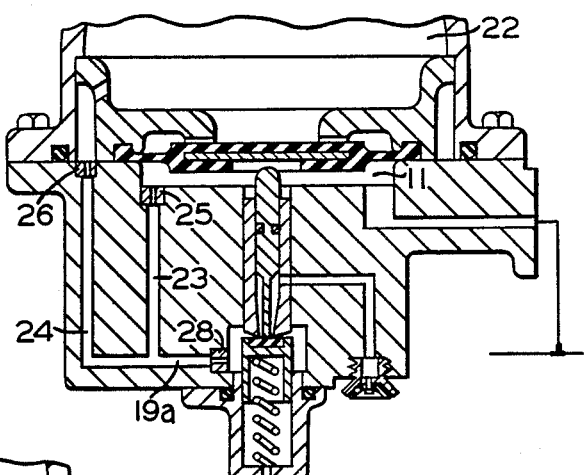
FIGS. 2 and 3 are views similar to FIG. 1 showing additional embodiments of the invention having a three-choke arrangement and a four-choke arrangement, respectively.

In the embodiment of FIG. 2 is provided a quick service valve device similar to that of FIG. 1, but having an improved performance made possible by the addition of a choke 28 in exhaust passage segment 19a at counterbore 13a. The advantage of this arrangement is that the rate of blowdown of pressure in quick service reference chamber 22 is retarded, without requiring the size of choke 26 to be so small as to adversely affect valve sensitivity. This is accomplished by reason of choke 28 being smaller in size than choke 25, so as to offer a further restriction to the blowdown of pressure in control chamber 11, thereby developing back pressure in passages 23 and 24, which tends to retard the blowdown of pressure in quick service reference chamber 22 to a greater extent than the retarded blowdown of pressure in control chamber 11. This change in the relative blowdown rates of pressure between chambers 11 and 22 results in a longer time to reduce a given actuating pressure differential across control piston 9 sufficiently to allow spring 20 to close exhaust valve 18. Consequently, exhaust valve 18 is held open for a longer period of time, during which local quick service venting of brake pipe pressure occurs past the unseated exhaust valve 18.

The optimum performance achieved by this embodiment of the invention results from the use of a #79 drill size for choke 26, a #62 drill size for choke 25, a #70 drill size for choke 28, and a 40–45 cubic inch volume of quick service reference chamber 22.

As compared to the embodiment of FIG. 1, the quick service valve device of FIG. 2 exhibits an improved performance by achieving a longer actuating cycle without loss of stability, but its operating characteristic remains cyclical under all practical conditions, regardless of the level of brake pipe pressure reduction in effect. While the addition of choke 28 establishes a longer period during which local quick service venting of brake pipe pressure occurs during each cycle of operation, it will be appreciated that the rate of brake pipe pressure vented during this longer period of quick service activity is somewhat reduced by the restrictive effect of choke 28 on the local venting of brake pipe pressure and, in this sense, limits the full potential that can be realized by retarding the blowdown of pressure in quick service reference chamber 22.

Figure 3:
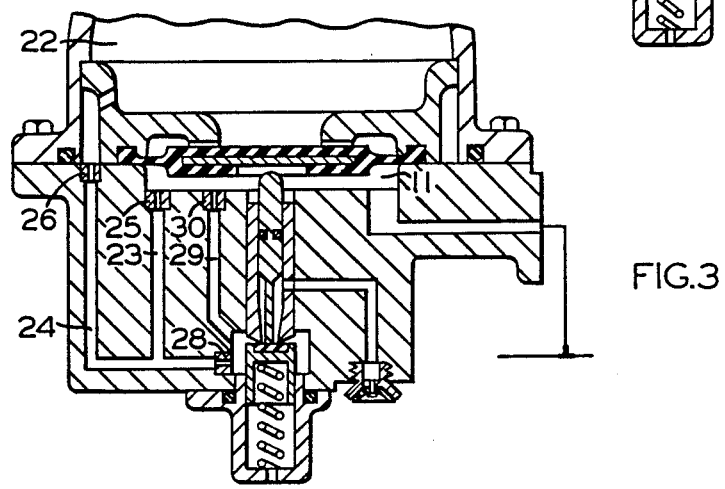

In the embodiment of FIG. 3, there is provided a quick service valve device similar to that of FIG. 2, but having a further modification that makes it possible to realize the full potential offered by the improvement in the embodiment of FIG. 2. This modification comprises the addition of a shunt passage 29 having a choke 30 therein. One end of passage 29 opens to chamber 22 and the other end opens to counterbore 13a. Such an arrangement allows choke 30 to establish the desired quick service venting of brake pipe pressure in bypass of choke 28, thus allowing choke 28 to be selected only with regard to establishing the desired back pressure in passages 23, 24 to thereby control the relative blowdown time between chambers 11 and 22 and, accordingly, the time period during which valve 18 is held open to establish the quick service venting of brake pipe pressure, as discussed relative to the FIG. 2 embodiment. Since the size of choke 28 is not dictated by the required amount of brake pipe pressure to be vented during quick service, such requirement being handled by choke 30, it will be appreciated that the blowdown time of the relative pressures between chambers 11 and 22 can be set, so that within a predetermined range of brake pipe pressure reductions, the quick service valve device will not cycle off, except when the trainline brake pipe pressure reduction is terminated. In this sense, valve element 18 opens in response to a valid reduction of trainline brake pipe pressure, and remains open for a relatively long time period before cycling off under most conditions. However, when maximum quick service venting of brake pipe pressure is desired, the brake pipe pressure reduction will establish such an initial pressure differential across control piston 9 that the rates at which the pressure in chamber 11 and 22 blow down will not reduce this initial pressure differential sufficiently to allow spring 20 to close valve 18. Therefore, quick service valve device 1, according to the embodiment of FIG. 3, will operate without cycling during this period to produce maximum local quick service activity and, in response to other levels of brake pipe pressure reductions, will operate in a cyclic fashion, but with a relatively long period during which local quick service venting of brake pipe pressure occurs repeatedly, as long as the trainline brake pipe pressure reduction continues to provide a high level of quick service activity.

The optimum performance of this embodiment of the invention was achieved using a #79 drill size for choke 26, a #68 drill size for choke 25, a #70 drill size for choke 28, and a #70 drill size for choke 30, combined with a 40–45 cubic inch volume of quick service reference chamber 22.

We claim:

1. For use in an automatic fluid pressure brake system for a railway vehicle, a continual quick service valve device for providing a local venting of fluid pressure carried in a trainline brake pipe comprising:
   (a) a control piston delineating a control chamber on one side thereof connected to said brake pipe and a quick service reference chamber on the opposite side thereof;
   (b) a first passage between said control chamber and said reference chamber via which said reference chamber is charged with fluid pressure from said brake pipe;
   (c) an exhaust passage having a connection with said first passage at a location intermediate said control chamber and said reference chamber;
   (d) valve means in said exhaust passage for normally interrupting venting of said first passage in a deactuated condition of said control piston and for establishing venting of said first passage in an actuated condition of said control piston;
   (e) first choke means in said first passage between said reference chamber and said connection of said exhaust passage with said first passage for restricting the backflow of fluid pressure from said reference chamber in response to an external reduction of said brake pipe fluid pressure to thereby establish an actuating pressure differential across said control piston and, accordingly effect said actuated condition thereof, whereby the fluid under pressure in said control chamber and the fluid under pressure in said reference chamber are concurrently vented locally via said exhaust passage; and
   (f) second choke means in said first passage between said control chamber and said connection of said exhaust passage with said first passage for controlling the rate at which said brake pipe pressure is vented locally from said control chamber.

2. A quick service valve device, as recited in claim 1, wherein said first choke means is selected to restrict the rate of venting of said reference chamber pressure to thereby establish said actuating pressure differential across said control piston only when said external reduction of said brake pipe pressure corresponds to a brake application equal to or greater than a minimum service brake application.

3. A quick service valve device, as recited in claim 2, wherein the volume of said reference chamber is contained within the body of said quick service valve device.

4. A quick service valve device, as recited in claim 3, wherein said first choke means is provided by a choke fitting having a drill size less than the drill size of a choke fitting providing said second choke means.

5. A quick service valve device, as recited in claim 2, wherein said second choke means is selected to limit the rate at which said control chamber pressure is vented to at least a value that is insufficient to sustain said actuating pressure differential across said control piston against the rate at which said reference chamber pressure is vented, when said external brake pipe pressure reduction is terminated.

6. A quick service valve device, as recited in claim 2, wherein said second choke means is selected to limit the rate at which said control chamber pressure is vented to a value that is insufficient to sustain said actuating pressure differential across said control piston against the rate at which said reference chamber pressure is vented prior to said external reduction of said brake pipe pressure being terminated.

7. A quick service valve device, as recited in claim 4, further comprising third choke means in said exhaust passage for restricting said venting of said first passage in said actuated condition of said control piston, whereby a back-pressure is developed in said first passage to further restrict the rate of local venting of said reference chamber pressure via said first choke means.

8. A quick service valve device, as recited in claim 7, wherein said third choke means is provided by a choke fitting having a drill size less than the drill size of said second choke fitting and greater than the drill size of said first choke fitting.

9. A quick service valve device, as recited in claim 8, wherein said third choke means is located in said exhaust passage upstream of said valve means.

10. A quick service valve device, as recited in claim 9, further comprising a second passage connected between said control chamber and said exhaust passage at a location between said third choke means and said valve means.

11. A quick service valve device, as recited in claim 10, further comprising fourth choke means in said second passage.

12. A quick service valve device, as recited in claim 11, wherein said fourth choke means is provided by a choke fitting having a drill size less than the drill size of said second choke fitting and greater than the drill size of said first choke fitting.

13. A quick service valve device, as recited in claim 12, wherein said drill size of said fourth choke means is no greater than the drill size of said third choke means.

* * * * *